(12) United States Patent
Hu et al.

(10) Patent No.: US 11,310,153 B2
(45) Date of Patent: Apr. 19, 2022

(54) PACKET PROCESSING METHOD AND NETWORK DEVICE

(71) Applicant: Huawei Technologies Co., Ltd., Shenzhen (CN)

(72) Inventors: Jing Hu, Beijing (CN); Shuying Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/567,619

(22) Filed: Sep. 11, 2019

(65) Prior Publication Data

US 2020/0007439 A1 Jan. 2, 2020

Related U.S. Application Data

(63) Continuation of application No. PCT/CN2018/077778, filed on Mar. 1, 2018.

(30) Foreign Application Priority Data

Mar. 13, 2017 (CN) .......................... 201710145776.6

(51) Int. Cl.
*H04L 12/725* (2013.01)
*H04L 45/30* (2022.01)
(Continued)

(52) U.S. Cl.
CPC ............ *H04L 45/306* (2013.01); *H04L 45/38* (2013.01); *H04L 45/74* (2013.01); *H04L 47/2441* (2013.01); *H04L 69/22* (2013.01)

(58) Field of Classification Search
CPC ....... H04L 45/306; H04L 45/38; H04L 45/74; H04L 47/2441; H04L 69/22; H04L 67/32; H04L 29/06
See application file for complete search history.

(56) References Cited

U.S. PATENT DOCUMENTS

2003/0123447 A1 7/2003 Smith
2005/0083935 A1 4/2005 Kounavis et al.
(Continued)

FOREIGN PATENT DOCUMENTS

CN 1881950 A 12/2006
CN 1898916 A 1/2007
(Continued)

OTHER PUBLICATIONS

Machine Translation and Abstract of Chinese Publication No. CN102387082, Mar. 21, 2012, 14 pages.
(Continued)

*Primary Examiner* — Thai Nguyen
(74) *Attorney, Agent, or Firm* — Conley Rose, P.C.

(57) ABSTRACT

A packet processing method and a network device, where the method includes: receiving, by a network device, a packet, where the packet includes classification information, and the classification information includes M fields; determining, by the network device, K fields in the M fields according to indication information stored by the network device; determining, by the network device, a target classification rule based on a first classification rule set stored by the network device and the K fields, and processing the packet according to the target classification rule.

20 Claims, 2 Drawing Sheets

(51) Int. Cl.
*H04L 45/00* (2022.01)
*H04L 45/74* (2022.01)
*H04L 47/2441* (2022.01)
*H04L 69/22* (2022.01)

(56) References Cited

U.S. PATENT DOCUMENTS

| | | |
|---|---|---|
| 2006/0268876 A1 | 11/2006 | Grah |
| 2010/0110936 A1 | 5/2010 | Bailey et al. |
| 2010/0262684 A1 | 10/2010 | Valois et al. |
| 2012/0051263 A1 | 3/2012 | Ozawa et al. |
| 2013/0294428 A1* | 11/2013 | Wang ............ H04L 47/2441 370/338 |
| 2013/0301658 A1 | 11/2013 | Chiba |
| 2015/0078386 A1* | 3/2015 | Jackson ............ H04L 69/22 370/392 |
| 2017/0171362 A1* | 6/2017 | Bolotov ............ H04L 63/0263 |

FOREIGN PATENT DOCUMENTS

| | | |
|---|---|---|
| CN | 101861722 A | 10/2010 |
| CN | 102204180 A | 9/2011 |
| CN | 102387028 A | 3/2012 |
| CN | 102387082 A | 3/2012 |
| CN | 102427428 A | 4/2012 |
| CN | 102685008 A | 9/2012 |
| CN | 103339904 A | 10/2013 |
| CN | 106453131 A | 2/2017 |

OTHER PUBLICATIONS

Foreign Communication From A Counterpart Application, PCT Application No. PCT/CN2018/077778, English Translation of International Search Report dated May 18, 2018, 2 pages.
Foreign Communication From A Counterpart Application, PCT Application No. PCT/CN2018/077778, English Translation of Written Opinion dated May 18, 2018, 4 pages.

\* cited by examiner

PACKET PROCESSING METHOD AND NETWORK DEVICE

CROSS-REFERENCE TO RELATED APPLICATIONS

This application is a continuation of International Patent Application No. PCT/CN2018/077778, filed on Mar. 1, 2018, which claims priority to Chinese Patent Application No. 201710145776.6, filed on Mar. 13, 2017. The disclosures of the aforementioned applications are hereby incorporated by reference in their entireties.

TECHNICAL FIELD

This application relates to the field of information technologies, and more specifically, to a packet processing method and a network device.

BACKGROUND

After receiving packets, a network device may classify packets with a same feature into one category according to a preset classification rule to perform different processing on different types of packets. For example, the network device may perform processing such as rate limitation, filtering, packet statistics collection, and redirection on a packet based on a type of the packet.

The network device may classify a packet using some information carried in the packet. For example, the network device may classify the packet using one or more of a source Internet Protocol (IP) address, a destination IP address, a source port number, a destination port number, a protocol type, a source Media Access Control (MAC) address, and a destination MAC address that are carried in the packet. For ease of description, information that is used for classification and that is carried in the packet is referred to as classification information below.

When classifying the packet, the network device determines, according to a preset classification rule, a type to which the packet belongs. A quantity of digits included in each classification rule is equal to a quantity of bits included in the classification information. A plurality of digits included in each classification rule are in a one-to-one correspondence with a plurality of bits included in the classification information. The network device compares the classification information of the packet with digits included in a plurality of classification rules, to determine a classification rule that matches the classification information. The network device processes the packet according to the classification rule that matches the classification information. In the solution, packet processing efficiency is relatively low.

SUMMARY

Embodiments of this application provide a packet processing method and a network device to improve packet processing efficiency.

According to a first aspect, an embodiment of this application provides a packet processing method, where the method includes: receiving, by a network device, a packet, where the packet includes classification information, the classification information includes M fields, the M fields include X fields and K fields, the M fields include N bits, the X fields include P bits, the K fields include Q bits, N is a positive integer greater than or equal to 2, N is equal to a sum of Q and P, M is equal to a sum of K and X, Q, P, K, and X are all positive integers, and M is a positive integer greater than or equal to 2; determining, by the network device, the K fields in the M fields according to indication information stored by the network device, where the indication information includes M indication digits, the M fields are in a one-to-one correspondence with the M indication digits, a value of an indication digit corresponding to each of the K fields is equal to a first value, a value of an indication digit corresponding to each of the X fields is equal to a second value, and the first value is not equal to the second value; determining, by the network device, a target classification rule based on a first classification rule set stored by the network device and the K fields, where the target classification rule is a first classification rule in the first classification rule set, the first classification rule set includes T first classification rules, each of the T first classification rules includes K match fields, the K match fields included in each of the T first classification rules include Q digits, the K match fields included in each of the T first classification rules are in a one-to-one correspondence with the K fields, K match fields included in the target classification rule match the K fields, the K match fields included in the target classification rule are in a one-to-one correspondence with the K fields, and T is a positive integer greater than or equal to 1; and processing, by the network device, the packet according to the target classification rule. According to the foregoing embodiment, when determining a type of the packet, the network device does not need to use all bits in the classification information, and the network device can determine the type of the packet by comparing only some bits in the classification information with a classification rule. In this way, a quantity of times of comparison for determining the type of the packet can be reduced, thereby improving packet processing efficiency.

With reference to the first aspect, in a first possible implementation of the first aspect, M', N, and Q' meet the following relationship: M'+Q' is less than 2N, where M' denotes a quantity of bits included in the M indication digits, and Q' denotes a quantity of bits included in the K match fields included in each of the T first classification rules. A length of each classification rule is reduced. In this way, when storage space used by the network device to store the classification rule is unchanged, the network device can store more classification rules.

With reference to the first aspect or the first possible implementation of the first aspect, in a second possible implementation of the first aspect, before the determining, by the network device, the K fields in the M fields according to indication information stored by the network device, the method further includes: obtaining, by the network device, a second classification rule set, where the second classification rule set includes T second classification rules, a $t^{th}$ second classification rule in the T second classification rules includes N digits, the $t^{th}$ second classification rule includes M match fields, a quantity of digits included in an $m^{th}$ match field in the M match fields included in the $t^{th}$ second classification rule is equal to a quantity of bits included in an $m^{th}$ field in the M fields, t=1, . . . , and T, and m=1, . . . , and M; determining, by the network device, a type of each of the M match fields included in the $t^{th}$ second classification rule, where a match field in the M match fields included in the $t^{th}$ second classification rule is of a first type or a second type, K match fields in the M match fields included in the $t^{th}$ second classification rule are of the first type, X match fields in the M match fields included in the $t^{th}$ second classification rule are of the second type, a quantity of digits included in a $k^{th}$ match field in the K match fields in the M match fields included in the $t^{th}$ second classification rule is equal to a quantity of bits included in a $k^{th}$ field in the K fields, the K match fields in the M match fields included in the $t^{th}$ second classification rule include Q digits, and k=1, . . . , and K; and determining, by the network device, the M indication digits and a $t^{th}$ first classification rule in the T first classification rules based on the type of each of the M match fields included in the $t^{th}$ second classification rule and the K match fields in the M match fields included in the $t^{th}$ second classification rule, where the $t^{th}$ first classification rule includes K match fields, and the K match fields included in the first classification rule are the K match fields in the M match fields. According to the foregoing embodiment, the network device may determine a corresponding first classification rule according to a second classification rule, and a length of the first classification rule is less than a length of the corresponding second classification rule.

With reference to the second possible implementation of the first aspect, in a third possible implementation of the first aspect, the determining, by the network device, a type of each of the M match fields included in the $t^{th}$ second classification rule includes: when determining that values of the digits included in the $m^{th}$ match field in the M match fields included in the $t^{th}$ second classification rule include at least one specific value, determining, by the network device, that the $m^{th}$ match field is of the first type; or when determining that a value of each digit included in the $m^{th}$ match field in the M match fields included in the $t^{th}$ second classification rule is a general value, determining, by the network device, that the $m^{th}$ match field is of the second type, where the at least one specific value includes a first specific value and a second specific value, a first bit matches the first specific value, a second bit matches the second specific value, both the first bit and the second bit match the general value, a value of the first bit is 1, and a value of the second bit is 0. According to the foregoing embodiment, the network device may determine a corresponding first classification rule according to a second classification rule, and a length of the first classification rule is less than a length of the corresponding second classification rule.

With reference to the second possible implementation of the first aspect, in a fourth possible implementation of the first aspect, when P is a positive integer greater than or equal to 2, the determining, by the network device, a type of each of the M match fields included in the $t^{th}$ second classification rule includes: determining, by the network device, whether values of the digits included in the $m^{th}$ match field in the M match fields included in the $t^{th}$ second classification rule are exactly the same as values of digits included in an $m^{th}$ match field in M match fields included in a second classification rule other than the $t^{th}$ second classification rule in the T second classification rules; and if no, determining that the $m^{th}$ match field in the M match fields included in the $t^{th}$ second classification rule is of the first type; or if yes, determining that the $m^{th}$ match field in the M match fields included in the $t^{th}$ second classification rule is of the second type. According to the foregoing embodiment, the network device may determine a corresponding first classification rule according to a second classification rule, and a length of the first classification rule is less than a length of the corresponding second classification rule.

According to a second aspect, an embodiment of the present disclosure provides a network device, where the network device includes a unit configured to perform the method provided in the first aspect.

According to a third aspect, an embodiment of the present disclosure provides a computer readable storage medium, and a program stored in the computer readable storage medium includes an instruction used to perform the method provided in the first aspect.

According to a fourth aspect, an embodiment of the present disclosure provides a network device, and the network device includes the computer readable storage medium in the third aspect, a processor, and a transceiver. The processor is configured to execute, in combination with the transceiver, an instruction in a program stored in the computer readable storage medium, to complete packet processing.

DESCRIPTION OF EMBODIMENTS

Figure 1:
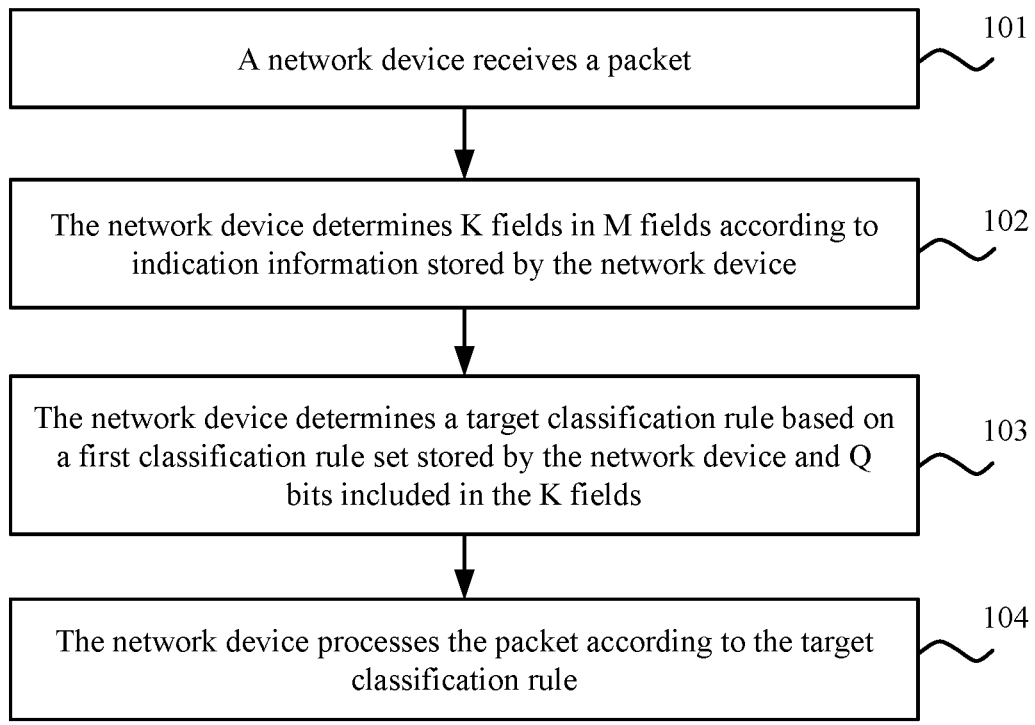
FIG. 1 is a schematic flowchart of a packet processing method according to an embodiment of this application.

The following describes the technical solutions in the embodiments of this application with reference to the accompanying drawings in the embodiments of this application.

Currently, if a length of classification information is Y bits, a classification rule needs to include Y digits, and the Y bits are in a one-to-one correspondence with the Y digits, where Y is a positive integer greater than or equal to 1. A value of the digit may be a specific value and a general value. The specific value includes a first specific value and a second specific value. A bit whose value is 1 matches the first specific value, and a bit whose value is 0 matches the second specific value. For ease of description, in the following, the bit whose value is 1 is referred to as a first bit, and the bit whose value is 0 is referred to as a second bit. Both the first bit and the second bit match the general value. The first specific value may be represented by 1, the second specific value may be represented by 0, and the general value may be represented by *. It may be understood that one bit may represent a maximum of two values. Therefore, if three different values need to be represented, at least two bits are required. In other words, one digit is represented by at least two bits. For example, a bit value 00 represents the first specific value, a bit value 01 represents the second specific value, and a bit value 10 represents the general value. Therefore, a length of the classification rule is at least 2Y bits.

For example, the classification information is a source port number and a destination port number. It is assumed that a network device needs to schedule packets whose source port numbers are 8080 and destination port numbers are 0 to 65535, and binary values of the source port number and the destination port number each include 16 bits. Therefore, a total of 32 bits are required for the source port number and the destination port number of the packet, and a classification rule used to determine that a received packet is a packet that needs to be scheduled needs to include 32 digits. Values of the 32 digits are 0001111110010000****************. The first 16 digits in the classification rule are in a one-to-one correspondence with the binary value of the source port number, and the last 16 digits are in a one-to-one correspondence with the binary value of the destination port number. It may be understood that because only whether a source port number is 8080 needs to be determined, a value of a digit corresponding to the source port number in the classification rule is the same as a binary value of the source port number. Because there is no need to care about a value of a destination port number, a value of a digit corresponding to the destination port number may be set to a general value. After receiving a packet, the network device determines whether values of 32 bits that are of the received packet and that are used to represent a source port number and a destination port number exactly match the 32 digits included in the classification rule. If the values of the 32 bits exactly match the 32 digits included in the classification rule, the network device determines that the packet is a packet that needs to be scheduled. If the values of the 32 bits do not exactly match the 32 digits included in the classification rule, the network device determines that the packet is a packet that does not need to be scheduled.

The network device in this application may be a router or a network switch.

FIG. 1 is a schematic flowchart of a packet processing method according to an embodiment of this application. The method includes steps 101, 102, 103, and 104.

101. A network device receives a packet.

For example, the network device may include an Ethernet interface. The packet may be an Ethernet frame. The network device may receive the Ethernet frame through the Ethernet interface.

The packet may be sent by user equipment, an Internet server, or another device. This is not limited in this embodiment of this application. The packet includes classification information. The classification information in the packet is information used in a classification rule to classify a packet. For example, if the information used in the classification rule to classify a packet is a source IP address and a destination IP address, the classification information is the source IP address and the destination IP address. For another example, if the information used in the classification rule to classify a packet is a source port number and a destination port number, the classification information is the source port number and the destination port number. A quantity of bits included in the classification information is related to content included in the classification information. For example, if the classification information includes a source port number, a length of the classification information is 16 bits. If the classification information includes a source IP address, a length of the classification information is 32 bits. The classification information includes M fields. The M fields include X fields and K fields. The M fields include N bits. The X fields include P bits. The K fields include Q bits. N is a positive integer greater than or equal to 2. N is equal to a sum of Q and P. M is equal to a sum of K and X. Q, P, K, and X are all positive integers. M is a positive integer greater than or equal to 2.

Optionally, in some embodiments, different fields in the M fields correspond to different information in the classification information. For example, if the classification information includes a source IP address and a destination IP address, a value of M may be 2. One of the two fields may be the source IP address, and the other field may be the destination IP address.

Optionally, in some other embodiments, the M fields may be obtained by equally or unequally dividing the classification information. For example, if the length of the classification information is 32 bits, the classification information may be equally divided into the M fields, and each field includes 32/M bits. In this case, the length of the classification information is divisible by M. Certainly, in some other embodiments, two fields in the M fields may differ in length. For example, if the length of the classification information is 32 bits, and M is equal to 4, quantities of bits included in the four fields may be 4, 4, 8, and 16 respectively.

In addition, values of bits in the two fields in the M fields may be exactly or partially the same, but the M fields do not include a repeated bit. The repeated bit is a bit that belongs to another field in addition to one field. In other words, an $n^{th}$ bit in the N bits can belong to only one of the M fields, where n=1, . . . , and N. For example, if the length of the classification information is 32 bits and M is equal to 2, a first field in the two fields may be a first bit to a $16^{th}$ bit in the 32 bits, and a second field may be a $17^{th}$ bit to a $32^{nd}$ bit in the 32 bits.

102. The network device determines K fields in M fields according to indication information stored by the network device.

For example, a forwarding plane memory of the network device may store the indication information. The network device may include a plurality of ports used to receive traffic. Each port corresponds to one piece of indication information. The memory may store a plurality of pieces of indication information corresponding to the plurality of ports. When the network device receives the packet through a port, a network processor of the network device may determine, according to indication information corresponding to the port used to receive the packet, indication information corresponding to the packet.

For example, the indication information includes M indication digits. The M indication digits are in a one-to-one correspondence with the M fields. A value of an indication digit corresponding to each of the K fields is equal to a first value, a value of an indication digit corresponding to each of the X fields is equal to a second value, and the first value is not equal to the second value. In other words, an indication digit is used to indicate whether a field corresponding to the indication digit needs to match a match field in a first classification rule. If a value of the indication digit is equal to the first value, the field corresponding to the indication digit needs to match the match field in the first classification rule. If a value of the indication digit is equal to the second value, the field corresponding to the indication digit does not need to match the match field in the first classification rule.

Optionally, in an embodiment, each indication digit includes one bit. The first value may be equal to 1, and the second value may be equal to 0.

Optionally, in some other embodiments, each digit includes two bits. The first value may be 10 or 11, and the second value may be 00.

103. The network device determines a target classification rule based on a first classification rule set stored by the network device and Q bits included in the K fields.

The target classification rule is a classification rule that matches the packet. A search engine of the network device may determine the classification rule.

For example, the first classification rule set includes T first classification rules. Each of the T first classification rules includes K match fields. The K match fields included in each of the T first classification rules include Q digits. T is a positive integer greater than or equal to 1. The K match fields included in each of the T first classification rules are in a one-to-one correspondence with the K fields. K match fields included in the target classification rule match the K fields.

More specifically, that K match fields included in the target classification rule match the K fields indicates that a $q^{th}$ digit in Q digits in the K match fields included in the target classification rule matches a $q^{th}$ bit in the Q bits in the K fields. Still further, a digit whose value is * (namely, a general value) matches both a bit whose value is 1 and a bit whose value is 0. A digit whose value is 1 matches a bit whose value is 1. A digit whose value is 0 matches a bit whose value is 0.

104. The network device processes the packet according to the target classification rule.

For example, the network device may be a router. The network device may include a forwarding table. The forwarding table may be a routing table. The forwarding table includes a plurality of entries. The forwarding table includes the first classification rule set. Each entry includes one classification rule. For example, each entry may include a match field and an action field. A classification rule corresponding to an entry may be included in match field of the entry.

After the search engine of the network device determines a target entry in the forwarding table, the network processor of the network device may process the packet based on an action field in the target entry. The target entry is an entry that matches the packet. A match field in the target entry includes the target classification rule. For example, the action field in the target entry may include an instruction for processing the packet. Alternatively, the action field in the target entry may include a parameter. The parameter may be a value assigned to a variable in a computer program used to process the packet. For example, the variable in the computer program used to process the packet may be an outbound interface, and the parameter is an identifier of the outbound interface. The computer program used to process the packet may be a computer program for forwarding the packet.

For example, the network device may perform processing such as rate limitation, filtering, packet statistics collection, and redirection on the packet based on a type of the packet.

According to the foregoing embodiment, when determining the type of the packet, the network device does not need to compare all bits in the classification information with a classification rule in the classification rule set. The network device can determine the target classification rule by comparing only some bits in the classification information with the classification rule in the classification rule set. Further, the network device may process the packet according to the target classification rule. Compared with a technical solution in which a target classification rule can be determined by comparing all bits in classification information with a classification rule in a classification rule set, the technical solution provided in this embodiment can reduce a quantity of times of comparison for determining the target classification rule, thereby improving packet processing efficiency.

Further, in some embodiments, M', N, and Q' meet the following relationship: M'+Q' is less than 2N, where M' denotes a quantity of bits included in each piece of indication information, and Q' denotes a quantity of bits included in match fields in each first classification rule. A length of each classification rule is reduced. In this way, when storage space used by the network device to store the classification rule is unchanged, the network device can store more classification rules.

Table 1 shows M pieces of indication information and first classification rules that are stored by the network device.

TABLE 1

| Rule | Indication information | Match field |
| --- | --- | --- |
| R1 | 0010 | 0000000011111*01 |
| R2 | 0010 | 0000000011100*10 |
| R3 | 0010 | 0000000011001*01 |

As shown in Table 1, the first classification rules stored by the network device include R1, R2, and R3. Each first classification rule includes indication information and one match field. The indication information includes a total of four indication digits. A value of each of the four indication digits is 0 or 1. Therefore, a length of each of the four indication digits may be one bit. A length of the indication information is four bits. The match field includes a total of 16 digits. A value of each of the 16 digits may be 1, 0, or *. In this case, a length of each digit is at least two bits. Therefore, a length of the match field is at least 32 bits. In conclusion, a length of each of the three first classification rules stored by the network device is 36 bits. The four indication digits in the indication information in each first classification rule respectively correspond to a source IP address, a destination IP address, a source port number, and a destination port number of a packet. After receiving the packet, the network device may determine that classification information of the packet includes the source IP address, the destination IP address, the source port number, and the destination port number. The network device may divide the classification information into four fields. The four fields are the source IP address, the destination IP address, the source port number, and the destination port number of the packet. The network device determines the source port number of the packet according to the indication information. The network device then may determine a match field that is in the first classification rule set and that matches the source port number of the packet, and a first classification rule to which the match field belongs is a target classification rule of the packet.

For example, it is assumed that the source IP address, the destination IP address, the source port number, and the destination port number of the packet received by the network device are respectively 192.101.1.1, 192.101.1.2, 253, and 800. Because the indication information in each of the first classification rules stored by the network device is 0010, the network device only needs to determine, in the first classification rule set, a first classification rule that matches the source port number of the packet. A binary value of the source port number is 0000000011111101. It may be learned that the match field in the first classification rule R1 in the first classification rule set matches the source port number of the packet. Therefore, the target classification rule corresponding to the packet is the first classification rule R1. After determining a type of the packet, the network device may perform subsequent processing on the packet based on the type of the packet.

Further, the network device may determine the first classification rule set based on a second classification rule set. The second classification rule set includes T second classification rules. A $t^{th}$ second classification rule in the T second classification rules includes N digits, where t=1, . . . , and T. The network device determines a type of each of M match fields included in the $t^{th}$ second classification rule. A match field in the M match fields included in the $t^{th}$ second classification rule is of a first type or a second type. K match fields in the M match fields included in the $t^{th}$ second classification rule are of the first type. X match fields in the M match fields included in the $t^{th}$ second classification rule are of the second type. A quantity of digits included in a $k^{th}$ match field in the K match fields in the M match fields included in the $t^{th}$ second classification rule is equal to a quantity of bits included in a $k^{th}$ field in the K fields, and the K match fields in the M match fields included in the $t^{th}$ second classification rule include a total of Q digits, where k=1, . . . , and K. The network device determines the M indication digits and a $t^{th}$ first classification rule in the T first classification rules based on the type of each of the M match fields included in the $t^{th}$ second classification rule and the K match fields. The $t^{th}$ first classification rule includes K match fields. The K match fields included in the first classification rule are the K match fields in the M match fields.

More specifically, the M indication digits are in a one-to-one correspondence with the M match fields. When a match field is of the first type, a value of an indication digit corresponding to the match field is the first value. When a match field is of the second type, a value of an indication digit corresponding to the match field is the second value.

Optionally, in some embodiments, that the network device determines a type of each of M match fields included in the $t^{th}$ second classification rule includes: when determining that values of digits included in an $m^{th}$ match field in the M match fields included in the $t^{th}$ second classification rule include at least one specific value, determining, by the network device, that the $m^{th}$ match field is of the first type; or when determining that a value of each digit included in an $m^{th}$ match field in the M match fields included in the $t^{th}$ second classification rule is a general value, determining, by the network device, that the $m^{th}$ match field is of the second type. The specific value includes a first specific value and a second specific value. A first bit matches the first specific value. A second bit matches the second specific value. Both the first bit and the second bit match the general value. The first bit is a bit whose value is 1. The second bit is a bit whose value is 0.

Optionally, in some embodiments, the $m^{th}$ match field may include only one digit (a digit). In this case, that values of digits included in an $m^{th}$ match field include at least one specific value means that a value of the unique digit included in the $m^{th}$ match field is a specific value. Similarly, that a value of each digit included in an $m^{th}$ match field is a general value means that a value of the unique digit included in the $m^{th}$ match field is a general value.

In some other embodiments, the $m^{th}$ match field may include a digit sequence (a sequence of digits). The digit sequence includes two or more digits. In this case, that values of digits included in an $m^{th}$ match field include at least one specific value means that a value of at least one digit in the digit sequence included in the $m^{th}$ match field is a specific value. Similarly, that a value of each digit included in an $m^{th}$ match field is a general value means that values of all digits in the digit sequence included in the $m^{th}$ match field are general values.

For example, Table 2 shows a second classification rule set.

TABLE 2

| | | |
|---|---|---|
| R1' | Match field 1 | ********************************* |
| | Match field 2 | ********************************* |
| | Match field 3 | 0000000011111*01 |
| | Match field 4 | **************** |
| R2' | Match field 1 | ********************************* |
| | Match field 2 | ********************************* |

TABLE 2-continued

| | | |
|---|---|---|
| | Match field 3 | 0000000011100*10 |
| | Match field 4 | **************** |
| R3' | Match field 1 | ********************************* |
| | Match field 2 | ********************************* |
| | Match field 3 | 0000000011001*01 |
| | Match field 4 | **************** |

The second classification rule set shown in Table 2 includes R1', R2', and R3'. The match field 1, the match field 2, the match field 3, and the match field 4 in each of the three second classification rules respectively correspond to a source IP address, a destination IP address, a source port number, and a destination port number of a packet. As shown in Table 2, a value of each digit in the match field 1, the match field 2, and the match field 4 in each of the three second classification rules is a general value. Therefore, the match field 1, the match field 2, and the match field 4 are of the second type. The match field 3 includes only one digit whose value is a general value. Therefore, the match field 3 is of the first type. In this case, values of indication digits corresponding to the match field 1, the match field 2, and the match field 4 are all 0, and a value of an indication digit corresponding to the match field 3 is 1. In other words, the network device may determine that indication information in each of the three second classification rules is 0010. In addition, the network device may determine that the match field 3 in each second classification rule is a match field in a corresponding first classification rule. In this way, the network device may determine that R1 in Table 1 is a classification rule corresponding to R1' in Table 2, R2 in Table 1 is a classification rule corresponding to R2' in Table 2, and R3 in Table 1 is a classification rule corresponding to R3' in Table 2.

Optionally, in some other embodiments, when P is a positive integer greater than or equal to 2, that the network device determines a type of each of M match fields includes: determining, by the network device, whether values of digits in an $m^{th}$ match field in the M match fields included in the $t^{th}$ second classification rule are the same as values of digits in an $m^{th}$ match field in M match fields included in a second classification rule other than the $t^{th}$ second classification rule in the T second classification rules; and if no, determining that the $m^{th}$ match field in the M match fields included in the $t^{th}$ second classification rule is of the first type; or if yes, determining that the $m^{th}$ match field in the M match fields included in the $t^{th}$ second classification rule is of the second type.

For example, Table 3 shows a second classification rule set.

TABLE 3

| | | |
|---|---|---|
| R1' | Match field 1 | 11000000011011000000000001******** |
| | Match field 2 | ********************************* |
| | Match field 3 | 0000000011111*01 |
| | Match field 4 | **************** |
| R2' | Match field 1 | 11000000011011000000000001******** |
| | Match field 2 | ********************************* |
| | Match field 3 | 0000000011100*10 |
| | Match field 4 | **************** |
| R3' | Match field 1 | 11000000011011000000000001******** |
| | Match field 2 | ********************************* |
| | Match field 3 | 0000000011001*01 |
| | Match field 4 | **************** |

The second classification rule set shown in Table 3 includes R1', R2', and R3'. The match field 1, the match field 2, the match field 3, and the match field 4 in each of the three second classification rules respectively correspond to a source IP address, a destination IP address, a source port number, and a destination port number of a packet. As shown in Table 3, a value of each digit in the match field 2 and the match field 4 in each of the three second classification rules is a general value. Therefore, the match field 2 and the match field 4 are of the second type. Although the digits in the match field 1 in each of the three second classification rules include a general value and a specific value, the match fields 1 in the three second classification rules are the same. In this case, the network device may also determine that the match field 1 is of the second type. The match field 3 includes only one digit whose value is a general value, and the match fields 3 in the three second classification rules are different. Therefore, the match field 3 is of the first type. In this case, values of indication digits corresponding to the match field 1, the match field 2, and the match field 4 are all 0, and a value of an indication digit corresponding to the match field 3 is 1. In other words, the network device may determine that indication information in each of the three second classification rules is 0010. In addition, the network device may determine that the match field 3 in each second classification rule is a match field in a corresponding first classification rule. In this way, the network device may determine that R1 in Table 1 is a classification rule corresponding to R1' in Table 3, R2 in Table 1 is a classification rule corresponding to R2' in Table 3, and R3 in Table 1 is a classification rule corresponding to R3' in Table 3.

At least 192 bits are required when the network device stores the second classification rule set shown in Table 3, while only 36 bits are required when the network device stores the first classification rule shown in Table 1. Therefore, according to the technical solution provided in this embodiment of this application, storage space required by the network device to store a classification rule is reduced. In this way, the network device can store more classification rules when total storage space is unchanged.

When all first classification rules stored by the network device include a same indication information part, the network device may store only one piece of indication information. In this way, storage space required by the network device to store the first classification rule can be further reduced.

The three first classification rules shown in Table 1 include same indication information. In some other embodiments, different first classification rules stored by the network device may alternatively include different indication information. For example, the network device may further store a first classification rule shown set in Table 4.

TABLE 4

| Rule | Indication information | Match field 1 | Match field 2 |
|---|---|---|---|
| R4 | 0001 | 0000000011111*01 | — |
| R5 | 0011 | 0000000011100*10 | 0000000011100*** |
| R6 | 1010 | 11000000011011000000001******** | 0000000011001*01 |

A process of determining, by the network device, a type of a received packet using the first classification rule shown set in Table 4 is similar to the process of determining a type of a packet according to Table 1, and details are not described herein. A process of determining, by the network device, the first classification rule shown set in Table 4 is also similar to the process of determining, by the network device, the first classification rule shown in Table 1, and details are not described herein.

A length of each indication digit in the examples shown in Table 1 to Table 4 is one bit. In some other embodiments, a length of each indication digit may be two bits. For example, in some cases, digits in one or more match fields in a comparison rule may be only 0 or 1, and digits in some other match fields include 0, 1, and *. In this case, the two types of match fields and a field that does not need to be matched may be distinguished using different indication digits. Because three different fields need to be distinguished, an indication digit requires at least two bits. For example, an indication digit 00 indicates that a field corresponding to the indication digit does not need to be matched, an indication digit 10 indicates that a field corresponding to the indication digit needs to be matched and digits in a match field include 0, 1, and *, and an indication digit 11 indicates that a field corresponding to the indication digit needs to be matched and digits in a match field include only 0 or 1. In this way, when a match field is stored, each digit in the match field corresponding to 11 may include only one bit.

For example, Table 5 shows another first classification rule set.

TABLE 5

| Rule | Indication information | Match field 1 | Match field 2 |
|---|---|---|---|
| R1 | 00-00-10-11 | 0000000011111*01 | 0000000011111001 |
| R2 | 00-00-10-11 | 0000000011100*10 | 0000000011100110 |
| R3 | 00-00-10-11 | 0000000011001*01 | 0000000011001101 |

As shown in Table 5, first classification rules stored by the network device include R1, R2, and R3. Each first classification rule includes indication information and two match fields. The indication information includes a total of four indication digits. A length of each of the four indication digits is two bits. A length of the indication information is eight bits. The four indication digits are respectively 00, 00, 10, and 11. It may be understood that a symbol "-" in the indication information in Table 5 is merely used to better distinguish between different indication digits during understanding of this embodiment of this application. In actual application, indication information stored by the network device does not include the symbol "-". The match field 1 includes a total of 16 digits. A value of each of the 16 digits included in the match field 1 may be 1, 0, or *. In this case, a length of each of the 16 digits included in the match field 1 is at least two bits. Therefore, a length of the match field 1 is at least 32 bits. The match field 2 also includes a total of 16 digits. Values of the 16 digits included in the match field 2 are 0 or 1. In this case, a length of each of the 16 digits included in the match field 2 may be one bit. Therefore, a length of the match field 2 may be at least 16 bits. In conclusion, a length of each of the three first classification rules stored by the network device is 56 bits. When the first classification rule shown set in Table 5 is stored, if the network device still uses the method used in Table 1, the length of the indication information may be shortened to four bits, and the length of the match field 2 is at least 32 bits. Therefore, when the first classification rule shown set in Table 5 is stored, if the method shown in FIG. 1 is used, a length of one first classification rule is 68 bits. Therefore, in the foregoing embodiment, a quantity of bits required for storing the first classification rule can be further reduced.

When receiving a packet, the network device may determine, based on a value of an indication digit in the first classification rule, whether each field in the packet is a field that needs to be compared. For ease of description, indication digits whose bit values are 10 and 11 may be referred to as the first value, and an indication digit whose bit value is 00 may be referred to as the second value. If the value of the indication digit is the first value, a field corresponding to the indication digit needs to be compared. If the value of the indication digit is the second value, a field corresponding to the indication digit does not need to be compared. An implementation of determining, by the network device, a type of the packet is similar to the implementation of determining, by the network device, a type of a packet in the foregoing example, and details are not described herein. An implementation of determining, by the network device, the first classification rule set shown in Table 5 is similar to the implementation of determining, by the network device, the first classification rule shown in Table 1 in the foregoing example, and details are not described herein.

Optionally, in some embodiments, any packet received by the network device matches at least one first classification rule stored by the network device. In this case, the target classification rule is a first classification rule stored by the network device, and the network device may directly determine the type of the packet.

Further, in some embodiments, the type of the packet that is determined by the network device may match two or more first classification rules. In this case, the type of the packet is a type of a first classification rule with a highest priority. The target classification rule is a first classification rule stored by the network device.

Optionally, in some other embodiments, the packet received by the network device may not match any first classification rule stored by the network device. In this case, the network device may determine that the packet is of a special type. There is also corresponding processing for the packet of the special type. After determining that the packet is of the special type, the network device may perform the corresponding processing on the packet. Alternatively, it may be considered that there is a special classification rule, and the network device does not store the special classification rule. However, when the packet received by the network device does not match any first classification rule stored by the network device, it may be considered that the packet matches the special classification rule. Further, it may be considered that the special classification rule also includes indication information and a match field, and one or more fields of the packet that are determined according to the indication information match the match field. A type corresponding to the special classification rule is the special type.

Figure 2:
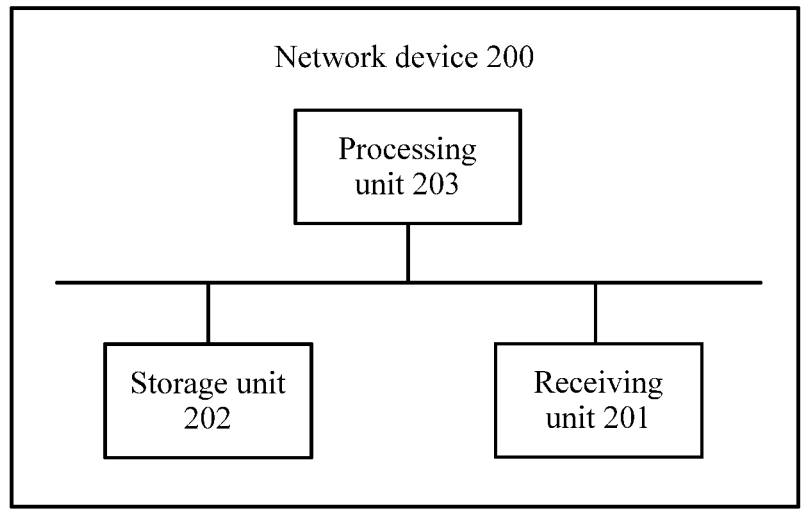
FIG. 2 is a structural block diagram of a network device according to an embodiment of this application.

FIG. 2 is a structural block diagram of a network device according to an embodiment of this application. As shown in FIG. 2, a network device 200 includes a receiving unit 201, a storage unit 202, and a processing unit 203.

The receiving unit 201 is configured to receive a packet. The packet includes classification information, the classification information includes M fields, the M fields include X fields and K fields, the M fields include N bits, the X fields include P bits, the K fields include Q bits, N is a positive integer greater than or equal to 2, N is equal to a sum of Q and P, M is equal to a sum of K and X, Q, P, K, and X are all positive integers, and M is a positive integer greater than or equal to 2.

The storage unit 202 is configured to store indication information and a first classification rule set.

The processing unit 203 is configured to determine the K fields in the M fields according to the indication information stored by the storage unit 202. The indication information includes M indication digits, the M fields are in a one-to-one correspondence with the M indication digits, a value of an indication digit corresponding to each of the K fields is equal to a first value, a value of an indication digit corresponding to each of the X fields is equal to a second value, and the first value is not equal to the second value.

The processing unit 203 is further configured to determine a target classification rule based on the first classification rule set stored by the storage unit 202 and the K fields. The target classification rule is a first classification rule in the first classification rule set. The first classification rule set includes T first classification rules. Each of the T first classification rules includes K match fields. The K match fields included in each of the T first classification rules include Q digits. The K match fields included in each of the T first classification rules are in a one-to-one correspondence with the K fields. K match fields included in the target classification rule match the K fields. The K match fields included in the target classification rule are in a one-to-one correspondence with the K fields. T is a positive integer greater than or equal to 1.

The processing unit 203 is further configured to process the packet according to the target classification rule.

Optionally, in some embodiments, M', N, and Q' meet the following relationship: M'+Q' is less than 2N, where M' denotes a quantity of bits included in the M indication digits, and Q' denotes a quantity of bits included in the K match fields included in each of the T first classification rules.

The receiving unit 201 may be implemented by a transceiver or a receiver. The storage unit 202 may be implemented by a memory. The processing unit 203 may be implemented by a processor.

For operations and functions of the receiving unit 201, the storage unit 202, and the processing unit 203, refer to the method in FIG. 1. To avoid repetition, details are not described herein.

Figure 3:
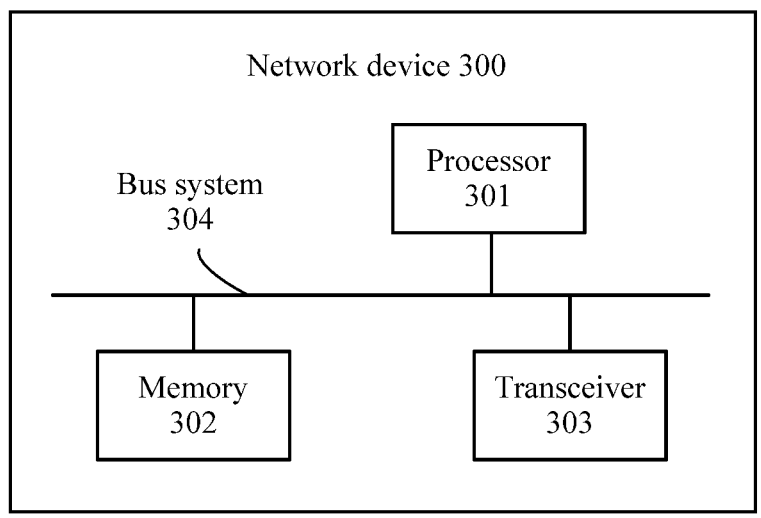
FIG. 3 is a structural block diagram of a network device according to an embodiment of this application.

FIG. 3 is a structural block diagram of a network device according to an embodiment of this application. A network device 300 shown in FIG. 3 includes a processor 301, a memory 302, and a transceiver 303.

Components of the network device 300 are coupled together using a bus system 304. In addition to a data bus, the bus system 304 includes a power bus, a control bus, and a status signal bus. However, for clarity of description, various types of buses in FIG. 3 are marked as the bus system 304.

The method disclosed in the foregoing embodiment of the present disclosure may be applied to the processor 301, or implemented by the processor 301. The processor 301 may be an integrated circuit chip and has a signal processing capability. In an implementation process, steps of the foregoing method may be implemented using a hardware integrated logical circuit in the processor 301 or using an instruction in a form of software. The processor 301 may be a general purpose processor, a digital signal processor (DSP), an application-specific integrated circuit (ASIC), a field programmable gate array (FPGA), another programmable logical device, a discrete gate, a transistor logical device, or a discrete hardware component, and may implement or perform the method, the steps, and logical block diagrams that are disclosed in the embodiments of the present disclosure. The general purpose processor may be a microprocessor, or the processor may be any conventional processor or the like. Steps of the method disclosed with reference to the embodiment of the present disclosure may be directly performed and completed by a hardware decoding processor, or may be performed and completed using a combination of hardware in a decoding processor and a software module. A software module may be located in a mature storage medium in the art, such as a random access memory (RAM), a flash memory, a read-only memory (ROM), a programmable read-only memory, an electrically erasable programmable memory, or a register. The storage medium is located in the memory 302, and the processor 301 reads an instruction in the memory 302, and completes the steps of the foregoing method in combination with hardware of the processor.

The transceiver 303 is configured to receive a packet. The packet includes classification information, the classification information includes M fields, the M fields include X fields and K fields, the M fields include N bits, the X fields include P bits, the K fields include Q bits, N is a positive integer greater than or equal to 2, N is equal to a sum of Q and P, M is equal to a sum of K and X, Q, P, K, and X are all positive integers, and M is a positive integer greater than or equal to 2.

The memory 302 is configured to store indication information and a first classification rule set.

The processor 301 is configured to determine the K fields in the M fields according to the indication information stored by the memory 302. The indication information includes M indication digits, the M fields are in a one-to-one correspondence with the M indication digits, a value of an indication digit corresponding to each of the K fields is equal to a first value, a value of an indication digit corresponding to each of the X fields is equal to a second value, and the first value is not equal to the second value.

The processor 301 is further configured to determine a target classification rule based on the first classification rule set stored by the memory 302 and the K fields. The target classification rule is a first classification rule in the first classification rule set. The first classification rule set includes T first classification rules. Each of the T first classification rules includes K match fields. The K match fields included in each of the T first classification rules include Q digits. The K match fields included in each of the T first classification rules are in a one-to-one correspondence with the K fields. K match fields included in the target classification rule match the K fields. The K match fields included in the target classification rule are in a one-to-one correspondence with the K fields. T is a positive integer greater than or equal to 1.

The processor 301 is further configured to process the packet according to the target classification rule.

For operations and functions of the processor 301, the memory 302, and the transceiver 303, refer to the method in FIG. 1. To avoid repetition, details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may implement the described functions using different methods with regard to each application.

It may be clearly understood by a person skilled in the art that, for the purpose of convenient and brief description, for a detailed working process of the foregoing system, apparatus, and unit, refer to a corresponding process in the foregoing method embodiment, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

What is claimed is:
1. A packet processing method, comprising:
receiving, by a network device, a packet, wherein the packet comprises classification information, wherein the classification information comprises M fields, wherein the M fields comprise X fields and K fields, wherein the M fields comprise N bits, wherein the X fields comprise P bits, wherein the K fields comprise Q bits, wherein N is a positive integer greater than or equal to 2, wherein N is equal to a sum of Q and P, wherein a quantity of the M fields is equal to a sum of a quantity of the K fields and a quantity of the X fields, wherein Q, P, K, and X are all positive integers greater than or equal to 1, and wherein M is a positive integer greater than or equal to 2;

determining, by the network device, the K fields in the M fields according to indication information stored by the network device, wherein the indication information comprises M indication digits, wherein the M fields are in a one-to-one correspondence with the M indication digits, wherein a value of one of the M indication digits corresponding to each of the K fields is equal to a first value, wherein a value of another one of the M indication digits corresponding to each of the X fields is equal to a second value, and wherein the first value is not equal to the second value;

determining, by the network device, a target classification rule based on a first classification rule set stored by the network device and the K fields, wherein the target classification rule is a first classification rule in the first classification rule set, wherein the first classification rule set comprises T first classification rules, wherein each of the T first classification rules comprises K match fields, wherein each of the K match fields in each of the T first classification rules comprises Q digits, wherein the K match fields in each of the T first classification rules are in a one-to-one correspondence with the K fields, and wherein T is a positive integer greater than or equal to 1; and processing, by the network device, the packet according to the target classification rule.

2. The method according to claim 1, wherein M', N, and Q' meet the following relationship: M'+Q' is less than 2N, wherein M' denotes a quantity of bits in the M indication digits, and wherein Q' denotes a quantity of bits in the K match fields in each of the T first classification rules.

3. The method according to claim 1, wherein before determining the K fields, the method further comprises obtaining, by the network device, a second classification rule set, wherein the second classification rule set comprises T second classification rules, wherein a $t^{th}$ second classification rule in the T second classification rules comprises N digits, wherein the $t^{th}$ second classification rule comprises M match fields, wherein a quantity of digits in a first $m^{th}$ match field in the M match fields in the $t^{th}$ second classification rule is equal to a quantity of bits in a second $m^{th}$ field in the M fields, wherein t=1, . . . , and T, and wherein m=1, . . . , and M.

4. The method according to claim 3, wherein before determining the K fields, the method further comprises determining, by the network device, a type of each of the M match fields in the $t^{th}$ second classification rule, wherein a match field in the M match fields in the $t^{th}$ second classification rule is of a first type or a second type, wherein K match fields in the M match fields in the $t^{th}$ second classification rule are of the first type, wherein X match fields in the M match fields in the $t^{th}$ second classification rule are of the second type, wherein a quantity of digits in a $k^{th}$ match field in the K match fields in the M match fields in the $t^{th}$ second classification rule is equal to a quantity of bits in a $k^{th}$ field in the K fields, wherein the K match fields in the M match fields in the $t^{th}$ second classification rule comprise Q digits, and wherein k=1, . . . , and K.

5. The method according to claim 4, wherein before determining the K fields, the method further comprises determining, by the network device, the M indication digits and a $t^{th}$ first classification rule in the T first classification rules based on the type of each of the M match fields in the $t^{th}$ second classification rule and the K match fields in the M match fields in the $t^{th}$ second classification rule, wherein the $t^{th}$ first classification rule comprises K match fields, and wherein the K match fields in the first classification rule are the K match fields in the M match fields.

6. The method according to claim 5, wherein determining the type of each of the M match fields in the $t^{th}$ second classification rule comprises determining, by the network device, that the $m^{th}$ match field is of the first type when determining that values of the digits in the $m^{th}$ match field in the M match fields in the $t^{th}$ second classification rule comprise at least one specific value.

7. The method according to claim 6, wherein determining the type of each of the M match fields comprises determining, by the network device, that the $m^{th}$ match field is of the second type when a value of each digit in the $m^{th}$ match field in the M match fields in the $t^{th}$ second classification rule is a general value, wherein the at least one specific value comprises a first specific value and a second specific value, wherein a first bit matches the first specific value, wherein a second bit matches the second specific value, wherein both the first bit and the second bit match the general value, wherein a value of the first bit is 1, and wherein a value of the second bit is 0.

8. The method according to claim 4, wherein when P is a positive integer greater than or equal to 2, determining, by the network device, the type of each of the M match fields in the $t^{th}$ second classification rule comprises determining, by the network device, whether values of the digits in the $m^{th}$ match field in the M match fields in the $t^{th}$ second classification rule are the same as values of digits in an $m^{th}$ match field in M match fields in a second classification rule other than the $t^{th}$ second classification rule in the T second classification rules.

9. The method according to claim 8, further comprising responsive to determining that the values of the digits in the $m^{th}$ match field in the M match fields in the $t^{th}$ second classification rule are not the same as values of digits in the $m^{th}$ match field in M match fields in the second classification rule other than the $t^{th}$ second classification rule, determining that the $m^{th}$ match field in the M match fields in the $t^{th}$ second classification rule is of the first type.

10. The method according to claim 8, further comprising responsive to determining, by the network device, that the values of the digits in the $m^{th}$ match field in the M match fields in the $t^{th}$ second classification rule are the same as values of digits in the $m^{th}$ match field in M match fields in the second classification rule other than the $t^{th}$ second classification rule, determining that the $m^{th}$ match field in the M match fields in the $t^{th}$ second classification rule is of the second type.

11. A network device, wherein the network device comprises:
   at least one processor; and
   a computer-readable storage medium storing a program to be executed by the processor, the program including instructions that, when executed by the processor, cause the network device to:
      receive a packet, wherein the packet comprises classification information, wherein the classification information comprises M fields, wherein the M fields comprise X fields and K fields, wherein the M fields comprise N bits, wherein the X fields comprise P bits, wherein the K fields comprise Q bits, wherein N is a positive integer greater than or equal to 2, wherein N is equal to a sum of Q and P, wherein a quantity of the M fields is equal to a sum of a quantity of the K fields and a quantity of the X fields, wherein Q, P, K, and X are all positive integers greater than or equal to 1, and wherein M is a positive integer greater than or equal to 2;

store indication information and a first classification rule set;

determine the K fields according to the indication information, wherein the indication information comprises M indication digits, wherein the M fields are in a one-to-one correspondence with the M indication digits, wherein a value of one of the M indication digits corresponding to each of the K fields is equal to a first value, wherein a value of another one of the M indication digits corresponding to each of the X fields is equal to a second value, and wherein the first value is not equal to the second value;

determine a target classification rule based on the first classification rule set stored and the K fields, wherein the target classification rule is a first classification rule in the first classification rule set, wherein the first classification rule set comprises T first classification rules, wherein each of the T first classification rules comprises K match fields, wherein each of the K match fields in each of the T first classification rules comprises Q digits, wherein the K match fields in each of the T first classification rules are in a one-to-one correspondence with the K fields, and wherein T is a positive integer greater than or equal to 1; and process the packet according to the target classification rule.

12. The network device according to claim 11, wherein M', N, and Q' meet the following relationship: M'+Q' is less than 2N, wherein M' denotes a quantity of bits in the M indication digits, and wherein Q' denotes a quantity of bits in the K match fields in each of the T first classification rules.

13. The network device according to claim 11, wherein the instructions, when executed by the processor, further cause the network device to obtain a second classification rule set, wherein the second classification rule set comprises T second classification rules, wherein a $t^{th}$ second classification rule in the T second classification rules comprises N digits, wherein the $t^{th}$ second classification rule comprises M match fields, wherein a quantity of digits in a first $m^{th}$ match field in the M match fields in the $t^{th}$ second classification rule is equal to a quantity of bits in a second $m^{th}$ field in the M fields, wherein t=1, . . . , and T, and wherein m=1, . . . , and M.

14. The network device according to claim 13, wherein the instructions, when executed by the processor, further cause the network device to determine a type of each of the M match fields in the $t^{th}$ second classification rule, wherein a match field in the M match fields in the $t^{th}$ second classification rule is of a first type or a second type, wherein K match fields in the M match fields in the $t^{th}$ second classification rule are of the first type, wherein X match fields in the M match fields in the $t^{th}$ second classification rule are of the second type, wherein a quantity of digits in a $k^{th}$ match field in the K match fields in the M match fields in the $t^{th}$ second classification rule is equal to a quantity of bits in a $k^{th}$ field in the K fields, wherein the K match fields in the M match fields in the $t^{th}$ second classification rule comprise Q digits, and wherein k=1, . . . , and K.

15. The network device according to claim 14, wherein the instructions, when executed by the processor, further cause the network device to:

determine the M indication digits and a $t^{th}$ first classification rule in the T first classification rules based on the type of each of the M match fields in the $t^{th}$ second classification rule and the K match fields in the M match fields in the $t^{th}$ second classification rule, wherein the $t^{th}$ first classification rule comprises K match fields, and wherein the K match fields in the first classification rule are the K match fields in the M match fields; and store the $t^{th}$ first classification rule in the T first classification rules and the M indication digits.

16. The network device according to claim 15, wherein the instructions, when executed by the processor, further cause the network device to determine that the $m^{th}$ match field is of the first type when determining that values of the digits in the $m^{th}$ match field in the M match fields in the $t^{th}$ second classification rule comprise at least one specific value.

17. The network device according to claim 16, wherein the instructions, when executed by the processor, further cause the network device to determine that the $m^{th}$ match field is of the second type when determining that a value of each digit in the $m^{th}$ match field in the M match fields in the $t^{th}$ second classification rule is a general value, wherein the at least one specific value comprises a first specific value and a second specific value, wherein a first bit matches the first specific value, wherein a second bit matches the second specific value, wherein both the first bit and the second bit match the general value, wherein a value of the first bit is 1, and wherein a value of the second bit is 0.

18. The network device according to claim 15, wherein the instructions, when executed by the processor, further cause the network device to be configured such that when P is a positive integer greater than or equal to 2, the network device determines whether values of the digits in the $m^{th}$ match field in the M match fields in the $t^{th}$ second classification rule are the same as values of digits in an $m^{th}$ match field in M match fields in a second classification rule other than the $t^{th}$ second classification rule in the T second classification rules.

19. The network device according to claim 18, wherein the instructions, when executed by the processor, further cause the network device to be configured such that when the network device determines that the values of the digits in the $m^{th}$ match field in the M match fields are not the same as values of digits in the $m^{th}$ match field in M match fields in the second classification rule other than the $t^{th}$ second classification rule in the T second classification rules, the network device determines that the $m^{th}$ match field in the M match fields in the $t^{th}$ second classification rule is of the first type.

20. The network device according to claim 18, wherein the instructions, when executed by the processor, further cause the network device to be configured such that when the network device determines that the values of the digits in the $m^{th}$ match field in the M match fields are the same as values of digits in the $m^{th}$ match field in M match fields in the second classification rule other than the $t^{th}$ second classification rule in the T second classification rules, the network device determines that the $m^{th}$ match field in the M match fields in the $t^{th}$ second classification rule is of the second type.

* * * * *